United States Patent
Watts et al.

(10) Patent No.: US 7,228,015 B2
(45) Date of Patent: Jun. 5, 2007

(54) INTEGRATED OPTIC POLARIZATION CONVERTER BASED ON STRUCTURAL CHIRALITY

(75) Inventors: Michael R. Watts, Hingham, MA (US); Hermann A. Haus, deceased, late of Lexington, MA (US); by Eleanor L. Haus, legal representative, Lexington, MA (US); Matteo Cherchi, Lecco (IT)

(73) Assignees: Massachusetts Institute of Technology, Cambridge, MA (US); Pirelli & C. Societa per Azioni, Milan (IT)

( * ) Notice: Subject to any disclaimer, the term of this patent is extended or adjusted under 35 U.S.C. 154(b) by 30 days.

(21) Appl. No.: 10/533,370

(22) PCT Filed: Oct. 30, 2003

(86) PCT No.: PCT/US03/34577

§ 371 (c)(1), (2), (4) Date: Apr. 29, 2005

(87) PCT Pub. No.: WO2004/042458

PCT Pub. Date: May 21, 2004

(65) Prior Publication Data

US 2006/0018584 A1    Jan. 26, 2006

Related U.S. Application Data

(60) Provisional application No. 60/478,751, filed on Jun. 16, 2003, provisional application No. 60/422,414, filed on Oct. 30, 2002.

(51) Int. Cl.
*G02B 6/28* (2006.01)
(52) U.S. Cl. .......................................... 385/11; 385/24
(58) Field of Classification Search .................... None
See application file for complete search history.

(56) References Cited

U.S. PATENT DOCUMENTS

| | | | |
|---|---|---|---|
| 4,998,793 | A | 3/1991 | Henry et al. |
| 5,225,797 | A | 7/1993 | Schary et al. |
| 5,243,669 | A * | 9/1993 | Alferness et al. ............. 385/11 |
| 5,418,867 | A | 5/1995 | Van Der Tol |
| 2003/0081903 | A1* | 5/2003 | Vahala et al. ................. 385/50 |

OTHER PUBLICATIONS

Oh et al., Polymeric Polarization-Independent Modulator Incorporating Twisted Optic-Axis Waveguide Polarization Converters, Nov. 1996, IEEE Photonic Technology Letters, vol. 8 No. 11, pp. 1483-1485.*

(Continued)

*Primary Examiner*—Sung Pak
*Assistant Examiner*—Tina M Wong
(74) *Attorney, Agent, or Firm*—Goodwin Procter LLP

(57) ABSTRACT

An integrated optic polarization converter includes a plurality of core layers used to approximate a gradually twisted waveguide and therein adiabatically transform a propagating mode from an initial polarization state to a different final polarization state.

16 Claims, 12 Drawing Sheets

OTHER PUBLICATIONS

Min-Cheol Oh, et al. "Simulation of Polarization Converter Formed by Poling Induced Polymer Waveguides," *Journal of Quantum Electronics,* Vo. 31, No. 9, Sep. 1995, pp. 1698-1704.

Watts, et al., "Polarization splitting and rotating through adiabatic transitions," *Proceedings of Integrated Photonics Research Conference 2003,* pp. 26-28, Jun. 2003.

Examination Report for European Patent Application 03776617.7, dated Sep. 22, 2005, 5 pages.

Fimmwave by Photon Design., from website: http://www.photond.com/products/fimmwave/fimmwave1.htm, (Sep. 8, 2005.

Huang, et al., "Realization of a Compact and Single-Mode Optical Passive Polarization Converter," *IEEE Photonics Technology Letters,* vol. 12, No. 3, pp. 317-319, (Mar. 2000).

Lui, et al., "Polarization Rotation in Semiconductor Bending Waveguides: a Coupled-Mode Theory Formulation," *Journal of Lightwave Technol.,* vol. 16, No. 5, pp. 929-936, (May 1998).

Mertens, et al., "New Highly Efficient Polarization Converters Based on Hybrid Supermodes," *Journal of Lightwave Technology,* vol. 13, No. 10, pp. 2087-2092, (Oct. 1995).

Shani, et al., "Polarization rotation in asymmetric periodic loaded rib waveguides," *Appl. Phys. Lett.,* vol. 59 (11), pp. 1278-1280 (Sep. 1991).

Snyder, et al., *Optical Waveguide Theory,* Chapman and Hall Ltd., New York, NY, (1983).

Tzolov et al., "A Passive polarization converter free of longitudinally periodic structure," *Optics Communications,* vol. 127, pp. 7-13 (Jun. 1996).

Watts, "Wavelength switching and routing through evanescently induced absorption," Master's thesis, Massachusetts Institute of Technology, (Jun. 2001).

\* cited by examiner

INTEGRATED OPTIC POLARIZATION CONVERTER BASED ON STRUCTURAL CHIRALITY

PRIORITY INFORMATION

This application is the U.S. national stage application of International (PCT) Patent Application Ser. No. PCT/US2003/034577, filed Oct. 30, 2003, which claims priority from provisional application Ser. Nos. 60/422,414, filed Oct. 30, 2002, and 60/478,751, filed Jun. 16, 2003. The disclosures of these three applications are incorporated herein by reference in their entirety.

BACKGROUND OF THE INVENTION

The invention relates to the field of integrated optic polarization converters, and in particular to integrated optic polarization converters based on mode evolution or structural chirality.

As the prevalence of fiber optic communication grows, the demand for more intricate processing of optical signals continues to increase. Since integrated optic devices allow for integration of many optical functions on a chip, integrated optic approaches will likely fill the demand for more intricate optical signal processing. However, in order to improve the functionality and reduce the cost per function the density of components on the chip must increase.

For a given wavelength, the confinement of a mode in a dielectric waveguide is determined by the contrast between the core and cladding indices, the higher the contrast, the tighter the confinement. An outgrowth of tighter confinement is the ability to pack waveguides closer together and guide light around sharper bends without substantial radiative loss. Since these are the two most critical parameters affecting device density, it can generally be said that the higher the index contrast the greater the device density. However, as the index contrast increases, the transverse electric (TE) and transverse magnetic (TM) modes propagating in the waveguides begin to exhibit different characteristics. While in a straight section of a square waveguide, the TE and TM modes propagate at the same rate, in a bend the TE and TM modes propagate at substantially different rates. And, when a pair of square high index contrast (HIC) guides is coupled, the TE and TM modes tend to couple at different rates. Since most integrated optic components are sensitive to both propagation velocity and guide-to-guide coupling, these effects result in polarization dependent performance, a result that is not compatible with the random polarization state emanating from the standard single mode fiber used in telecom applications.

One way to compensate these effects is to use a rectangular waveguide geometry and alter the aspect ratio of the guide to compensate for the natural difference in propagation around a bend and/or equalize the guide-to-guide coupling. However, while one or the other of these effects may be compensated in this manner for a particular device, as the index contrast increases it becomes difficult if not impossible to compensate both simultaneously in a manner that applies to all devices on the chip.

Another approach for overcoming the polarization sensitivity of HIC integrated optics is to split the random input polarization emanating from the single mode (SM) fiber with a polarizing beam splitter (PBS), couple the outputs to polarization maintaining (PM) fibers, twist one of these PM fibers by 90° degrees and couple the two fibers to separate paths on the integrated optic chip. On each of these paths identical structures are used to process the two components independently. At the output, these components are recombined by coupling to another pair of PM fibers, twisting the PM fiber of the path that had not previously been twisted and coupling both fibers to another PBS which has a SM fiber output. While such an approach, commonly referred to as a "polarization diversity" scheme, is feasible, when implemented with bulk optics it is also cumbersome. Aligning PM fibers is difficult and expensive. And, in order to preserve signal integrity the path lengths must be matched to within at least one-tenth of a bit length (i.e. ~2 mm for 10 Gb/s signals and ~0.5 mm for 40 Gb/s signals assuming an index of 1.5).

A better approach is to integrate the splitting function of the PBS and the rotating function of the twisted PM fiber onto the integrated optic chip. Doing so would eliminate the need to align PM fibers and path lengths could be matched easily through lithography.

Several integrated optic polarization splitters and rotators (or converters) have been proposed. However, most of the devices proposed to date rely on the coupling of a pair of waveguide modes. Devices based on coupled modes generally exhibit a wavelength sensitivity resulting from differences in the dispersion of the super-modes propagating in the structure. Further, such approaches are very sensitive to fabrication errors. Even slight changes in the waveguide geometries or separation can have a significant impact on the device performance.

A better way to form a polarization splitter or rotator is to use the principle of mode evolution. By making gradual (or adiabatic) changes to the waveguide geometry, the modes in the guide can be conditioned and the polarization states separated or rotated. Such an approach only requires that the modes not exchange power which can be assured by proper design of the waveguide and a slow evolution of the structure. Since prevention of mode coupling is a relatively loose requirement, devices based on mode evolution tend to be wavelength insensitive and fabrication tolerant. It has been proposed and demonstrated that a polarization splitter based on mode evolution can be formed, however, this approach has the disadvantage of requiring multiple waveguide materials. And, to date no polarization converters have been proposed which utilize the principle of mode evolution.

Generally, it is the object of the invention to convert a TM input polarization to a TE output polarization or vice versa with an integrated optic device based on the principle of mode evolution or structural chirality.

It is yet another object of the invention that the device be wavelength insensitive, tolerant to fabrication errors, and require only a single material system to construct.

These and other objects of the present invention will become apparent to those skilled in the art from the following detailed description and accompanying figures.

SUMMARY OF THE INVENTION

According to one aspect of the invention, there is provided an integrated optic polarization converter. The integrated optic polarization converter includes a plurality of core layers used to approximate a gradually twisted waveguide and therein adiabatically transform a propagating mode from an initial polarization state to a different final polarization state.

According to another aspect of the invention, there is provided a method of forming an integrated optic polarization converter. The method includes receiving an initial polarization state. Also, the method includes forming a plurality of core layers to approximate a gradually twisted waveguide and therein adiabatically transform a propagating mode from the initial polarization state to a different final polarization state.

DETAILED DESCRIPTION OF THE INVENTION

The mode structure for a general rectangular dielectric waveguide consists of a minimum of two guided electromagnetic modes, a TE (or quasi-TE) mode and a TM (or quasi-TM) mode, and an infinite sum of unguided (or radiation) electromagnetic modes. If a rectangular waveguide is rotated by 90°, its mode structure is similarly rotated with the TE mode becoming the TM mode and vice-versa. Therefore, a smooth transition between a rectangular waveguide and its rotated counterpart should enable polarization conversion through mode evolution. However, any perturbation to the initial structure will induce coupling between the modes. For a mode evolution approach to work, power exchange between the modes must be inhibited.

Figure 1:
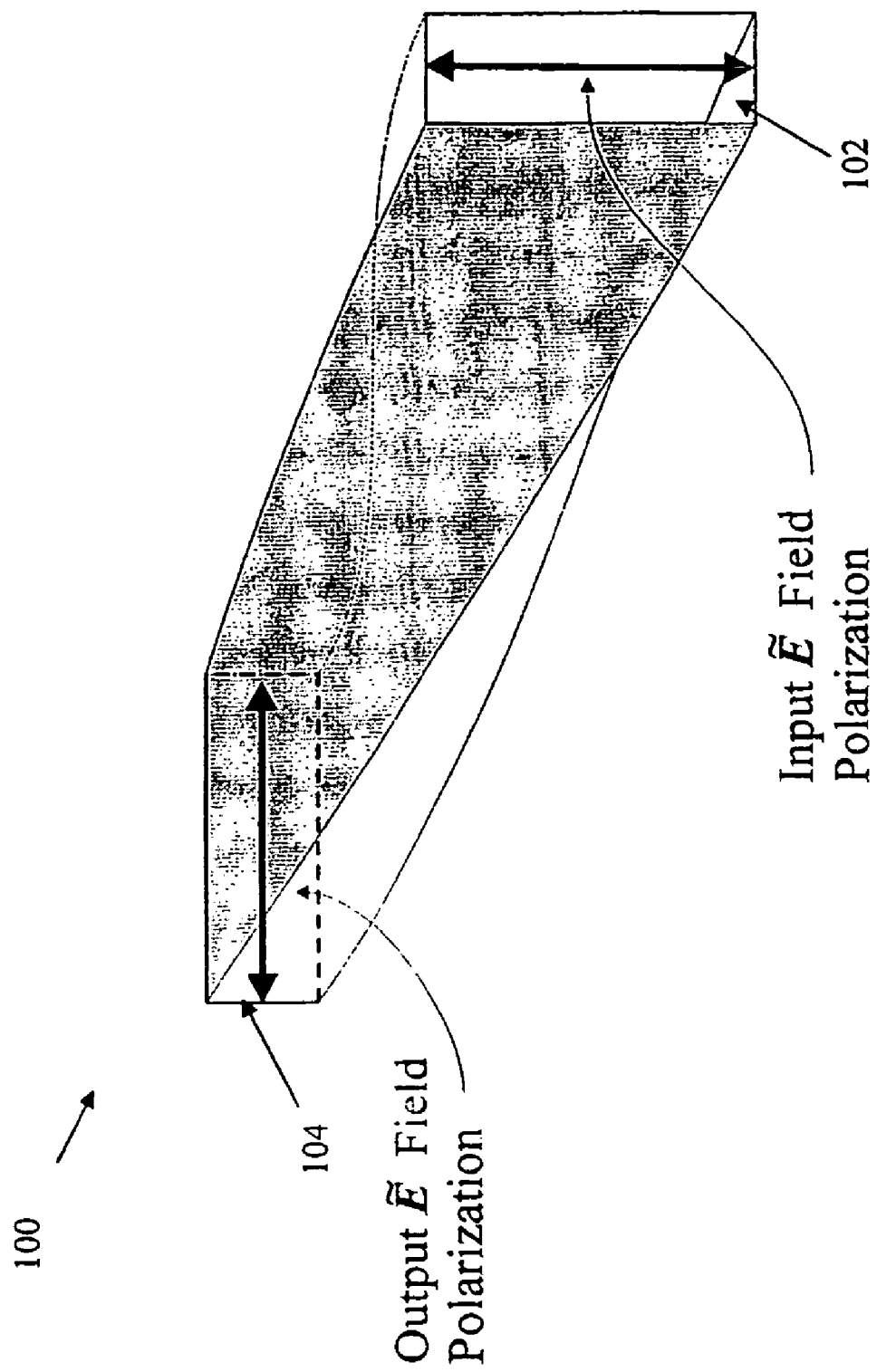
FIG. 1 is a schematic diagram of a twisted waveguide.

A way to transition between a rectangular waveguide and its rotated counterpart is to twist the initial structure. FIG. 1 is a schematic diagram of an adiabatically twisted dielectric waveguide 100 having an input 102 and output 104. The twisting of the waveguide 100 acts as a perturbation to the mode structure of the rectangular guide inducing coupling amongst the guided modes and between the guided modes and radiation modes. Since coupling between guided and radiation modes requires strong perturbations, coupling to radiation modes can generally be ignored in slowly evolving structures. However, coupling amongst the guided modes remains an important effect.

If the waveguide 100 in FIG. 1 were square, the guided modes would be degenerate and therefore propagate at the same rate. The field coupling induced by the twist would add coherently along the length of the structure and the power exchange between the modes would be substantial. This would be an undesirable result, as the twisted waveguide 100 is meant to work on the principle of mode evolution rather than mode coupling. To inhibit the coupling, a rectangular waveguide with a large aspect ratio is used so that the guided modes will propagate at different rates. In this case, the power coupled from one mode to the other along the length of the structure will add incoherently as long as the structure is sufficiently long to allow the modes to de-phase. As the index contrast, aspect ratio, and length of the transition increase, the degree of incoherence also increases and the accumulated power exchange along the length of the structure can be made arbitrarily low. The performance departs from ideality only when the transition becomes too short or the aspect ratio of the guide too small to allow for de-phasing to occur.

The structure 100 in FIG. 1 is an ideal structure with a perfect twist of the waveguide. However, for practical implementation of the device all such geometries should be formed from micro-fabrication techniques, which generally require the structures be formed from a layering process with features defined through lithography. It is therefore desirable to approximate this twisted waveguide with a finite number of layers. Herein, a layer is defined as a horizontal slice through the waveguide cross-section which contains no variations of refractive index in the vertical direction.

An optical waveguide is typically formed by dielectric materials of various refractive indices. Generally, the higher index materials are considered core materials while the lower index materials are considered cladding materials. To be specific, a cladding material is herein defined as the material of lowest refractive index within a layer. All other materials within the layer are therefore core materials. A core layer is defined as a layer containing a core material.

The basic requirements for the structure to operate as a polarization converter are quite loose, with the primary requirement being that the structural chirality, or twist in the electromagnetic sense, be preserved. A few of the possible geometries are described below.

Figure 2:
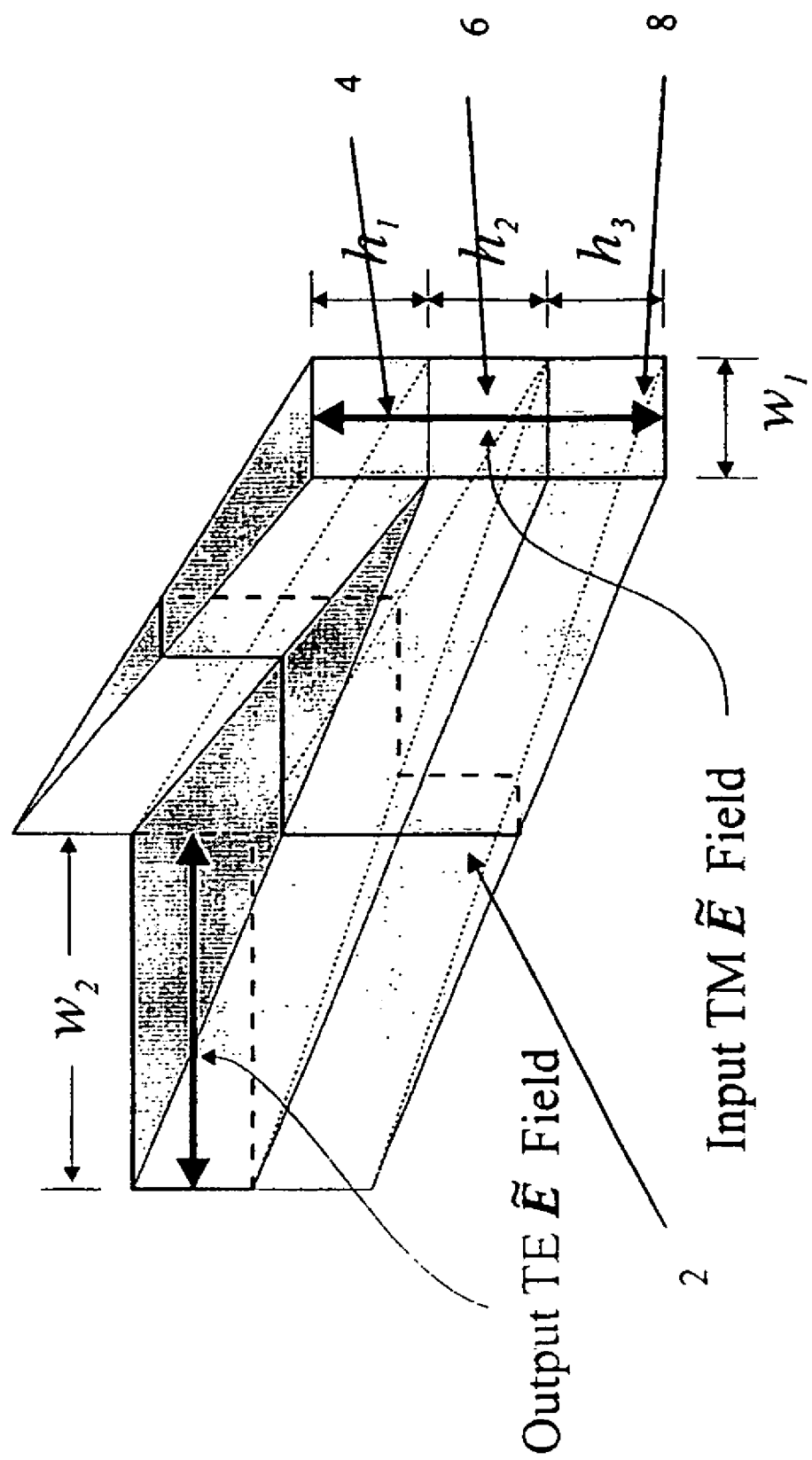
FIG. 2 is a schematic diagram of a polarization converter using three adiabatically tapered core layers.

FIG. 2 is a schematic diagram of an integrated optic polarization converter 2 using three core layers 4, 6, and 8 with heights $h_1$, $h_2$, and $h_3$, respectively, to approximate a twisted waveguide and transform the structure from a vertically aligned rectangular waveguide to a horizontally aligned rectangular waveguide. In the described embodiment, each of the layers 4, 6, and 8 have a width of $w_1$ at the input. At the output of the structure 2 the waveguide width is $w_2$, which is approximately equivalent to the sum of the heights $h_1$, $h_2$, and $h_3$. The height at the output is that of the middle layer $h_2$. However, the geometry of the structure may vary depending on the requirements of the application.

A cladding, with a lower refractive index than the core layers, is typically arranged around the core layers to provide light confinement.

The transition is achieved by removing material from the upper 4 and lower 8 core layers and adding material to the middle core layer 6 in a manner approximating a rotation of the waveguide axis.

Figure 3:
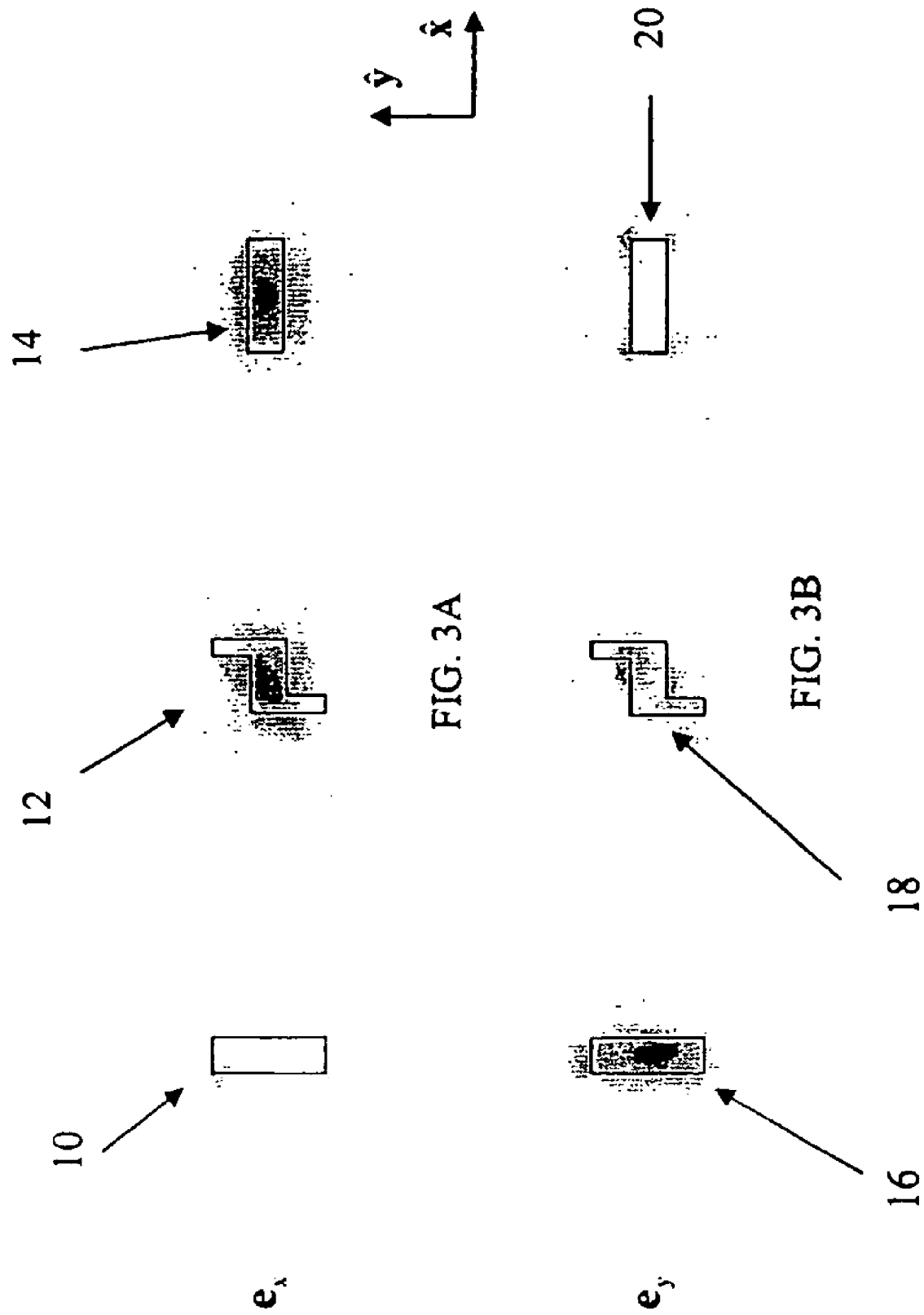
FIGS. 3A–3B are grayscale images of the fundamental mode electric field propagating in the waveguide of the invention.

FIGS. 3A–3B are grayscale images of the fundamental mode field propagating in the inventive waveguide. FIG. 3A depicts a grayscale image of the $\hat{x}$ component of the fundamental mode electric field profile for the starting 10, middle 12 and ending 14 structures. FIG. 3B depicts a grayscale image of the $\hat{y}$ component of the fundamental mode electric field profile for the starting 16, middle 18 and ending 20 structures.

From the mode profiles, it is shown that the mode is initially polarized along the $\hat{y}$ direction, but mid-point along the structure the mode field components are somewhat evenly split, and at the end of the structure the mode is polarized primarily along the $\hat{x}$ direction. Coupled local mode theory dictates that an adiabatic transition between these structures enables mode conversion from the $\hat{y}$ polarized state in the initial guide to the $\hat{x}$ polarized state in the final guide 2. Since both the primary and secondary modes are transformed, the inverse is also true. That is a $\hat{x}$ polarized state in the initial guide will generally be transformed to a $\hat{y}$ polarized state in the final guide. Additionally, the principle of reciprocity ensures that the device operates in reverse. That is, $\hat{x}$ and $\hat{y}$ polarized states starting from the end of the structure will be adiabatically transformed into $\hat{y}$ and $\hat{x}$ polarized states at the beginning of the structure, respectively.

Figure 4:
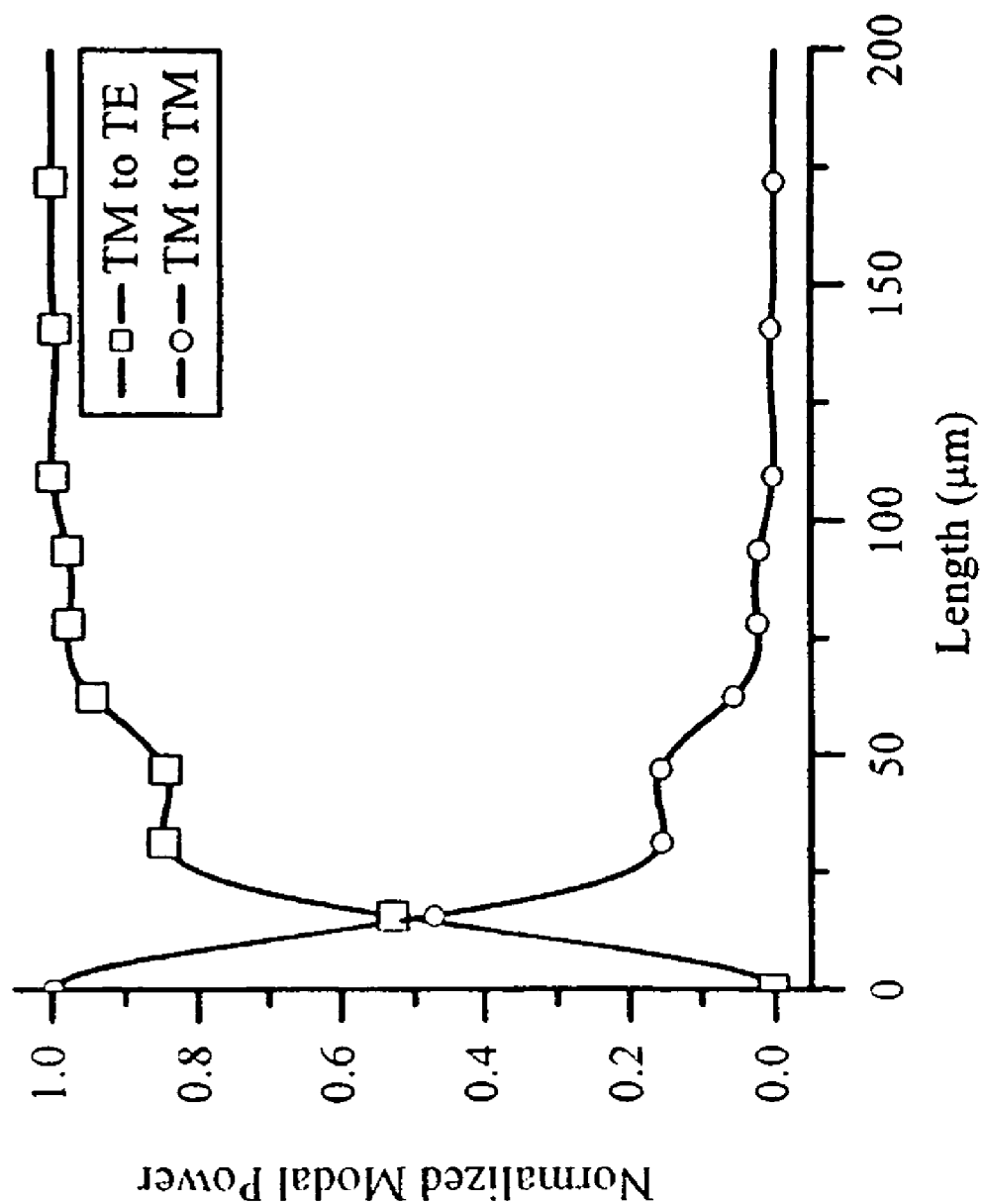
FIG. 4 is a graph demonstrating the performance of a particular implementation of the device in FIG. 2 as a function of the device length.

FIG. 4 is a graph demonstrating the performance of a particular implementation of the converter depicted in FIG. 2 as a function of the structure length. In this embodiment, $h_1=h_2=h_3=w_1=0.25$ µm, $w_2=0.75$ µm, the core index is 2.2 and the cladding index is 1.445, and the transition is linear along the direction of propagation $\hat{z}$, however, in other embodiments these parameters can vary and non-linear transitions may be utilized. A three-dimensional mode scattering formulation was used to perform the simulation and the wavelength considered was 1.55 µm. Mode scattering simulations are a particularly accurate modeling tool when only a few modes per waveguide cross-section are required to represent the system. Since the radiation modes do not substantially influence the operation of approaches based on mode evolution, the mode-scattering technique is well suited for these problems. Additionally, the results presented were confirmed at a few device lengths with full three dimensional finite difference time domain (FDTD) simulations. The FDTD method is a complete numerical implementation of Maxwell's Equations. The results of the mode scattering simulation presented in FIG. 4 show that 99% or more of the power is transferred successfully from a TM polarization to a TE polarization with taper lengths of only a couple hundred microns. As was hypothesized for a guide with a pure twist, it is found that when the taper is too short, and thus the perturbation too strong to allow for the modes to de-phase, the guided modes exchange power and the device performance degrades leaving power in the TM polarized state.

Figure 5:
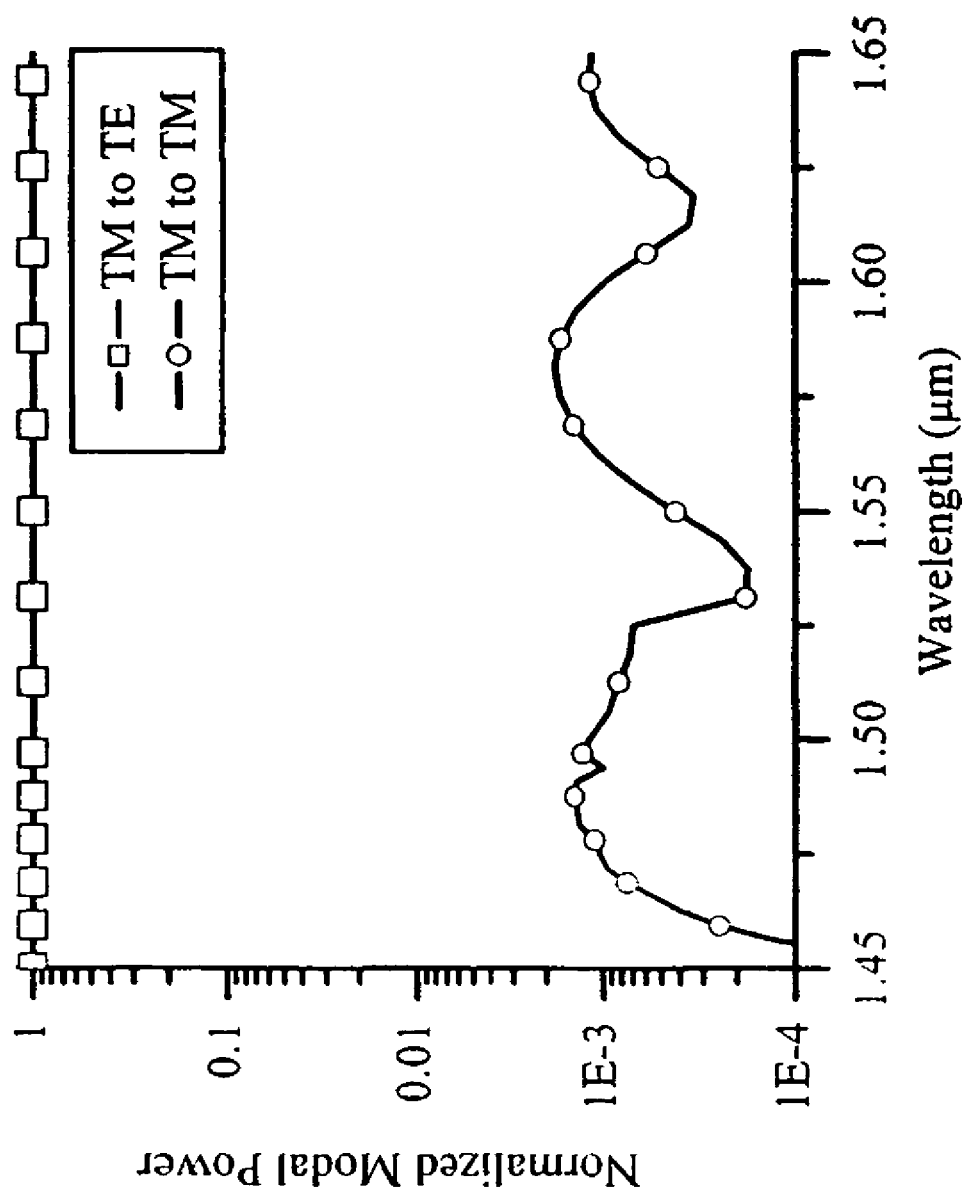
FIG. 5 is a graph demonstrating the performance of a particular implementation of the device in FIG. 2 as a function of the wavelength of the electromagnetic field.

FIG. 5 is a graph demonstrating the broadband performance of the particular embodiment considered in FIG. 4 when the device length is set to 200 Jun. Here again, a three-dimensional mode scattering formulation was used to perform the simulation. FIG. 5 shows that no wavelength sensitivity is discernable over the entire 1.45 µm to 1.65 µm regime; a wavelength span of interest for telecommunications. The broadband performance of the approach is consistent with the underlying theory of operation. Since the aim is to transition modes from one state to another without introducing coupling amongst the modes, the bandwidth is only limited by the extent to which the coupling amongst the modes is increased at one wavelength relative to another. At short wavelengths the appearance of additional modes may facilitate this coupling and at long wavelengths the modes become more closely phase-matched thereby reducing the primary effect, which inhibits coupling between the modes. In either case, large changes in wavelength are required for these phenomena to take effect. This is in contrast to approaches based on coupled modes that suffer from an inherent bandwidth limitation associated with differences in the dispersion of the super-modes.

Many variations of the basic structure are possible. Both the geometry and refractive indices may differ from the particular embodiment described.

Figure 6:
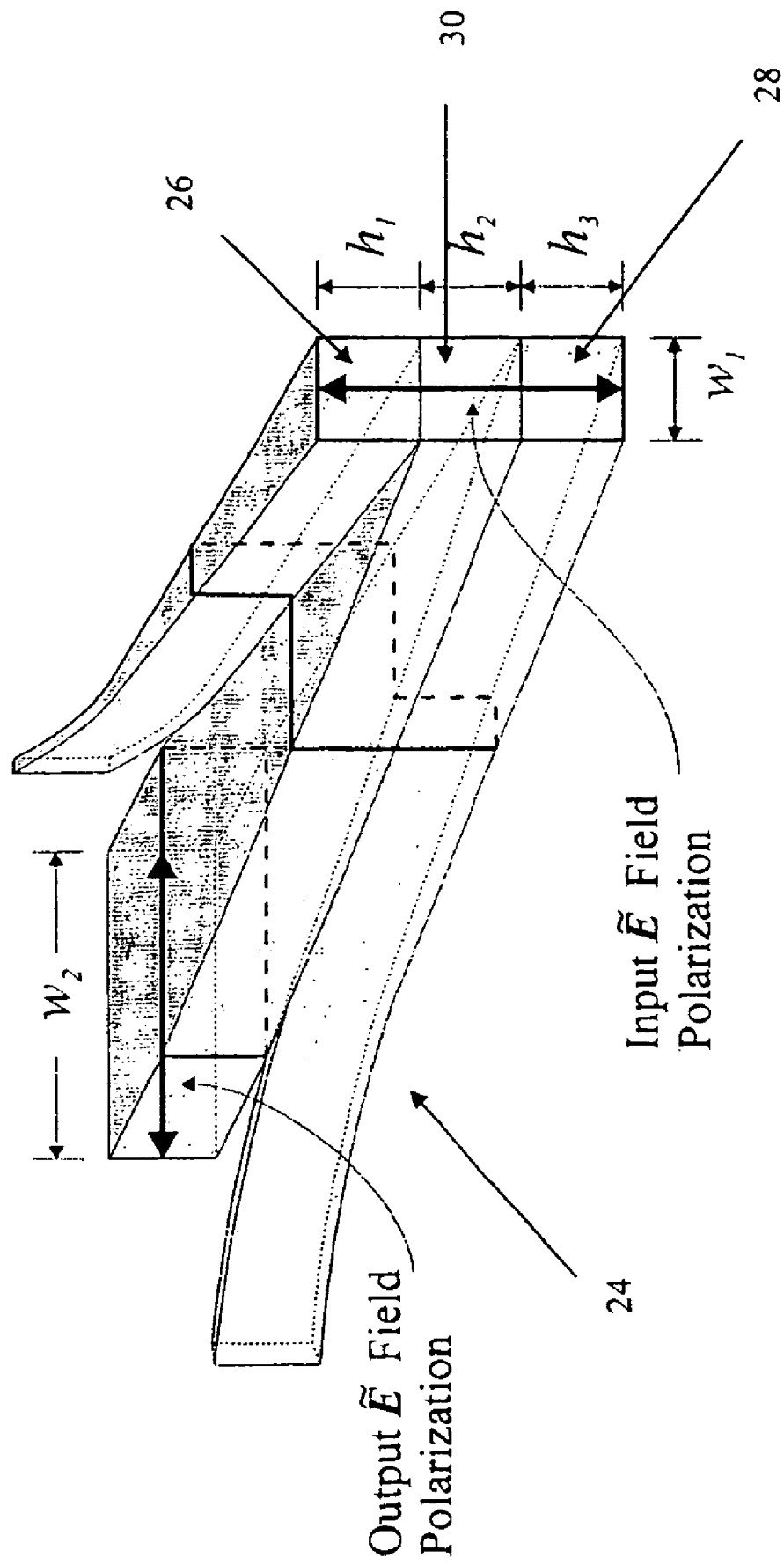
FIG. 6 is a schematic diagram of a polarization converter using three adiabatically tapered and separated core layers.

FIG. 6 is a schematic diagram of another embodiment of the inventive polarization converter 24. Fabrication limitations may prevent the upper 26 and lower 28 layers from reaching infinitesimal widths smoothly. Therefore, it may be advantageous to consider structures where the final transition is handled by separating the upper 26 and lower 28 layers from the middle layer 30, as shown in FIG. 6. This results in a nearly equivalent adiabatic transition to the final output waveguide.

The structure 24 is designed so that initially the upper layer 26, middle layer 30, and lower layer 28 will have heights of $h_1$, $h_2$, and $h_3$ respectively. Moreover, each of the layers 26, 28, and 30 will have a width of $w_1$ at the input. Note at the output of the structure 24 the width is $w_2$, which is approximately equivalent to the sum of the heights $h_1$, $h_2$, and $h_3$. The height at the output is that of the middle layer $h_2$.

A cladding, with a lower refractive index than the core layers, is typically arranged around the core layers to provide light confinement.

Figure 7:
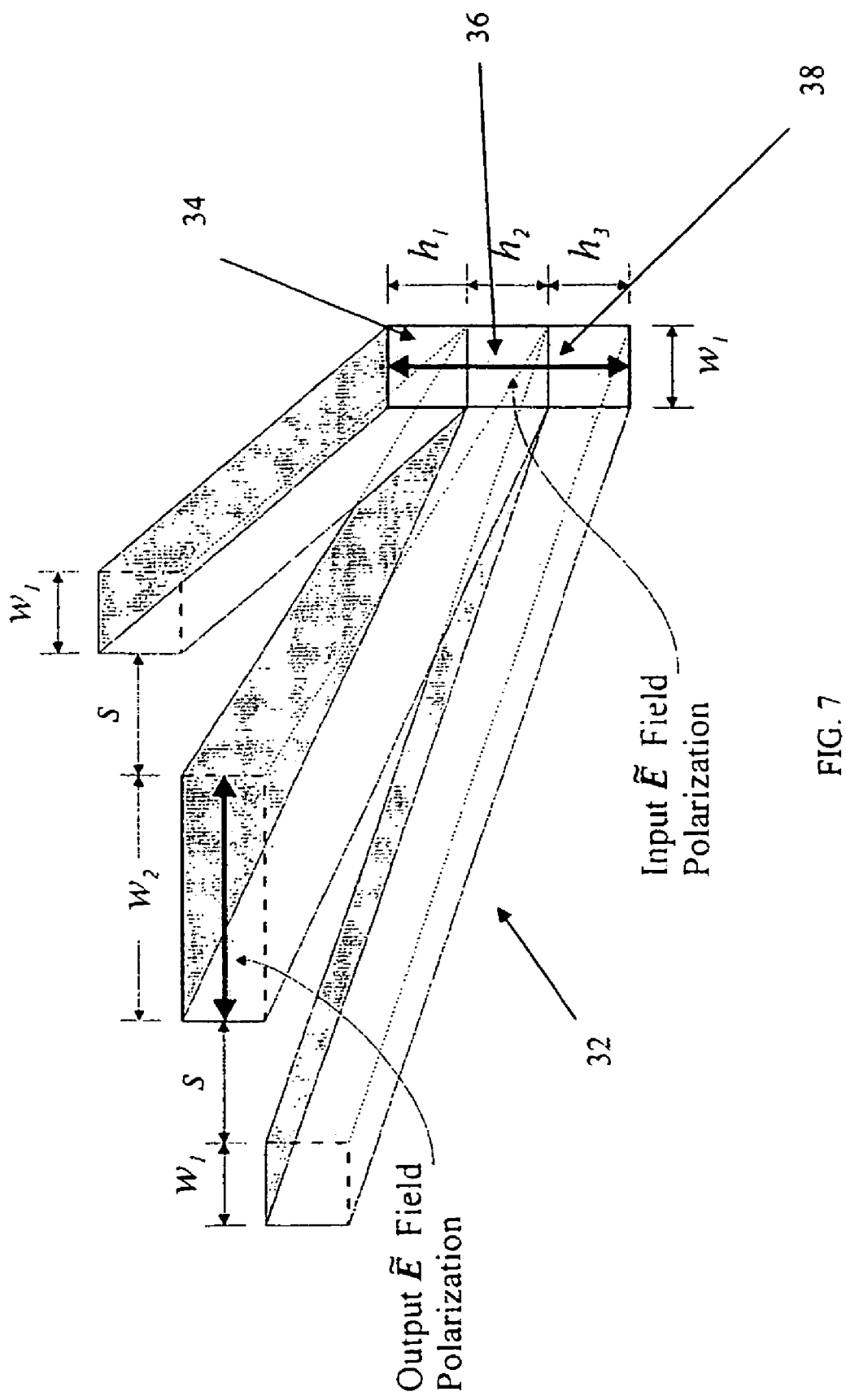
FIG. 7 is a schematic diagram of a polarization converter using adiabatic tapering of the middle layer and adiabatic separation of the upper and lower core layers.

FIG. 7 is a schematic diagram of another embodiment of the inventive polarization converter 32 similar in nature to that of FIG. 6. However, here the upper 34 and lower 38 layers are in fact not tapered at all, but rather gradually separated from the middle layer 36. In this manner the minimum feature size can be made even larger thereby further facilitating the ease of fabrication. The upper 34 and middle 36 layers are separated at the output by a distance s, and the middle 36 and lower 38 layers are separated at the output by a distance s.

The structure 32 is designed so that initially the upper layer 34, middle layer 36, and lower layer 38 will have heights of $h_1$, $h_2$, and $h_3$ respectively. Moreover, each of the layers 34, 36, and 38 will have a width of $w_1$. Note at the output of the structure 32 the width is $w_2$, which is approximately equivalent to the sum of the heights $h_1$, $h_2$, and $h_3$. The height at the output is that of the middle layer $h_2$.

A cladding, with a lower refractive index than the core layers, is typically arranged around the core layers to provide light confinement.

Figure 8:
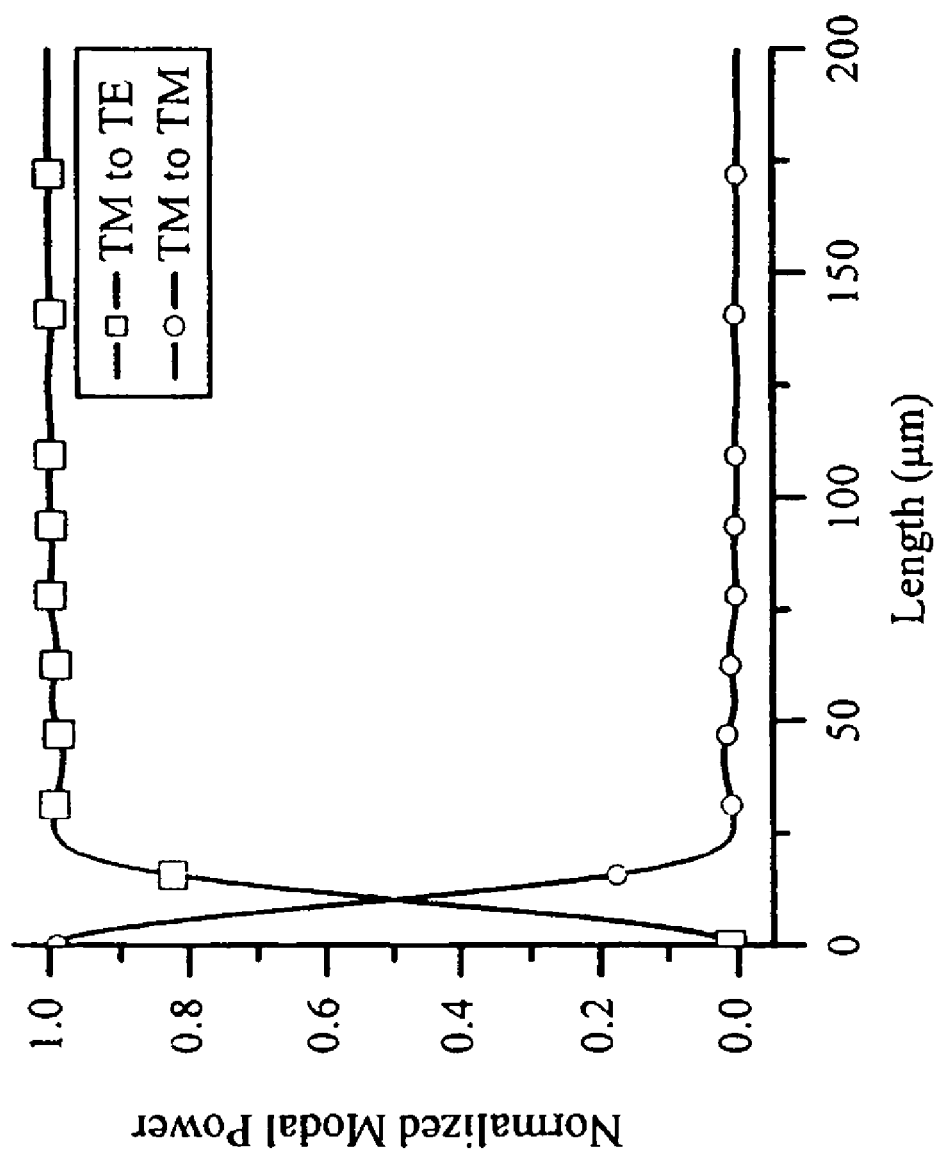
FIG. 8 is a graph demonstrating the performance of a particular implementation of the device in FIG. 7 as a function of the device length.

FIG. 8 is a graph demonstrating the performance of a particular embodiment of the polarization converter depicted in FIG. 7 as a function of the structure length. In this embodiment, the parameters were set as follows $h_1=h_2=h_3=0.25$ µm, $w_1=0.25$ µm, $w_2=0.75$ µm, $s=0.125$ µm and the core and cladding indices are 2.2 and 1.445, respectively. In other embodiments, these parameters can vary. Again, a three-dimensional mode scattering formulation was used to perform the simulation and the wavelength considered was 1.55 µm. Performance similar to that of the original embodiment is obtained with device lengths of only a couple hundred microns.

Figure 9:
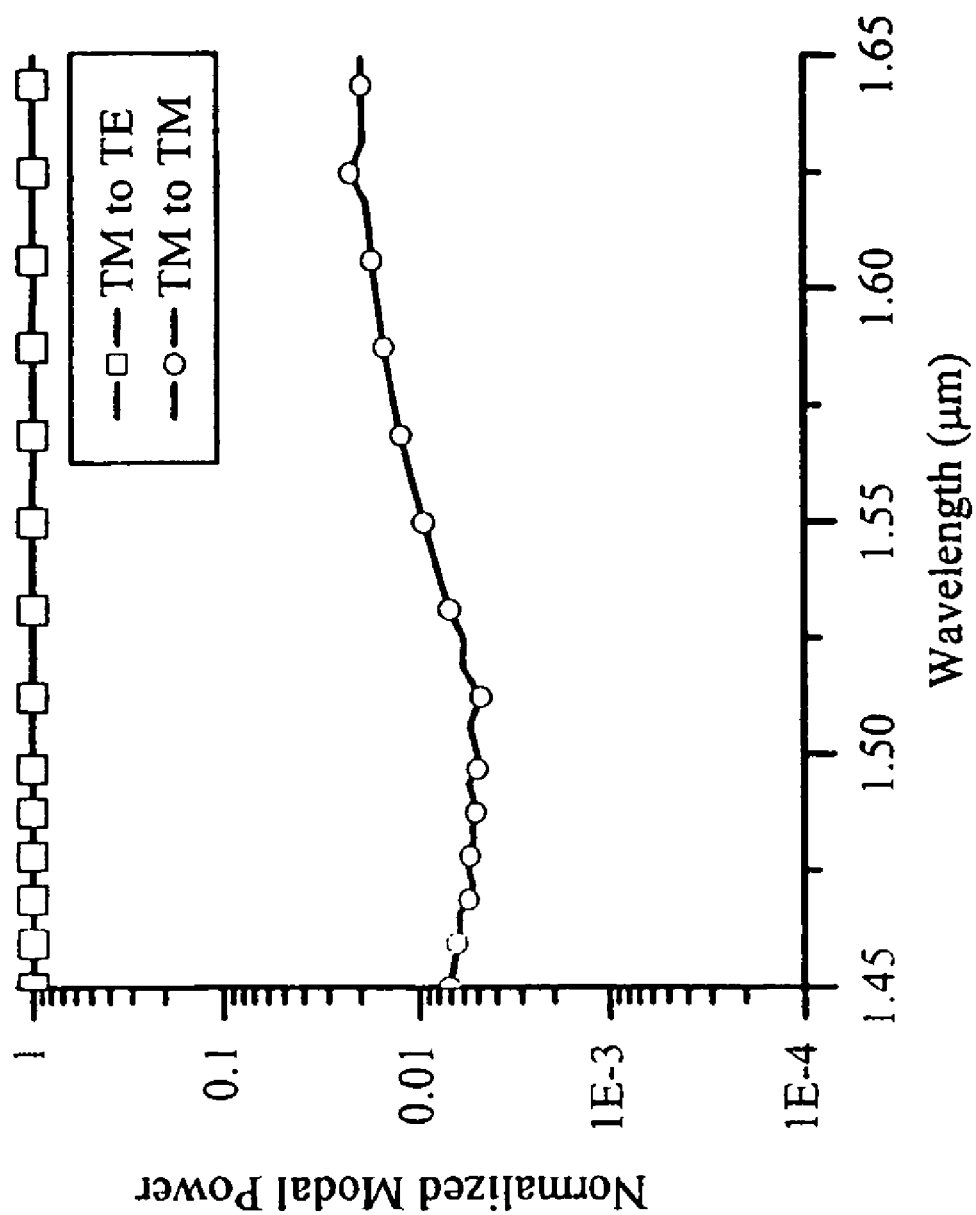
FIG. 9 is a graph demonstrating the performance of a particular implementation of the device in FIG. 7 as a function of the wavelength of the electromagnetic field.

FIG. 9 is a graph demonstrating the broadband performance of the particular embodiment considered in FIG. 7 when the structure length is set to 100 µm. Here again, a three-dimensional mode scattering formulation was used to perform the simulation. FIG. 5 shows that no wavelength sensitivity is discernable over the entire 1.45 µm to 1.65 µm regime.

Figure 10:
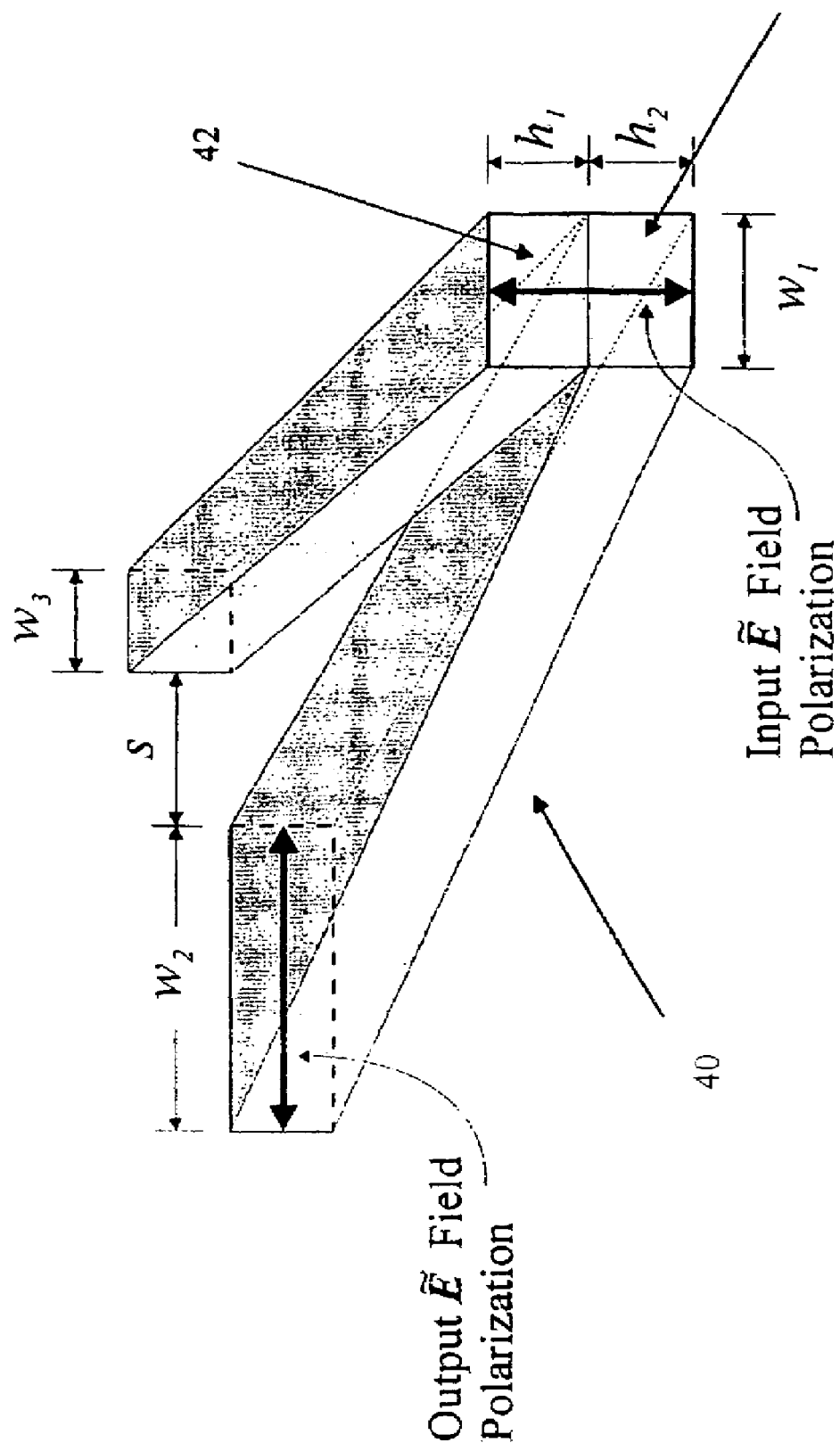
FIG. 10 is a schematic diagram of a polarization converter using only two layers that are adiabatically tapered and separated.

Although three layers are the minimum required for the device to be symmetric, any of the aforementioned approaches may be applied to a device composed of only two core layers. FIG. 10 is a schematic diagram of a polarization converter 40 using only two core layers 42, 44. In this embodiment, the upper 42 and lower 44 layers are both tapered and separated simultaneously.

The polarization converter 40 is designed so that initially the upper layer 42 and lower layer 44 will have heights of $h_1$ and $h_2$, respectively. Moreover, each of the layers 42 and 44 will have a width of $w_1$ at the input. At the output, the width of the upper layer is $w_1$. Note that at the output of the chiral waveguide structure 40 the width is $w_2$, which is approximately equivalent to the sum of the heights h, and $h_2$. The height at the output is that of the middle layer $h_2$. The performance of the device is unaffected by the ordering of the layers (i.e. which layer sits on top).

A cladding, with a lower refractive index than the core layers, is typically arranged around the core layers to provide light confinement.

Figure 11:
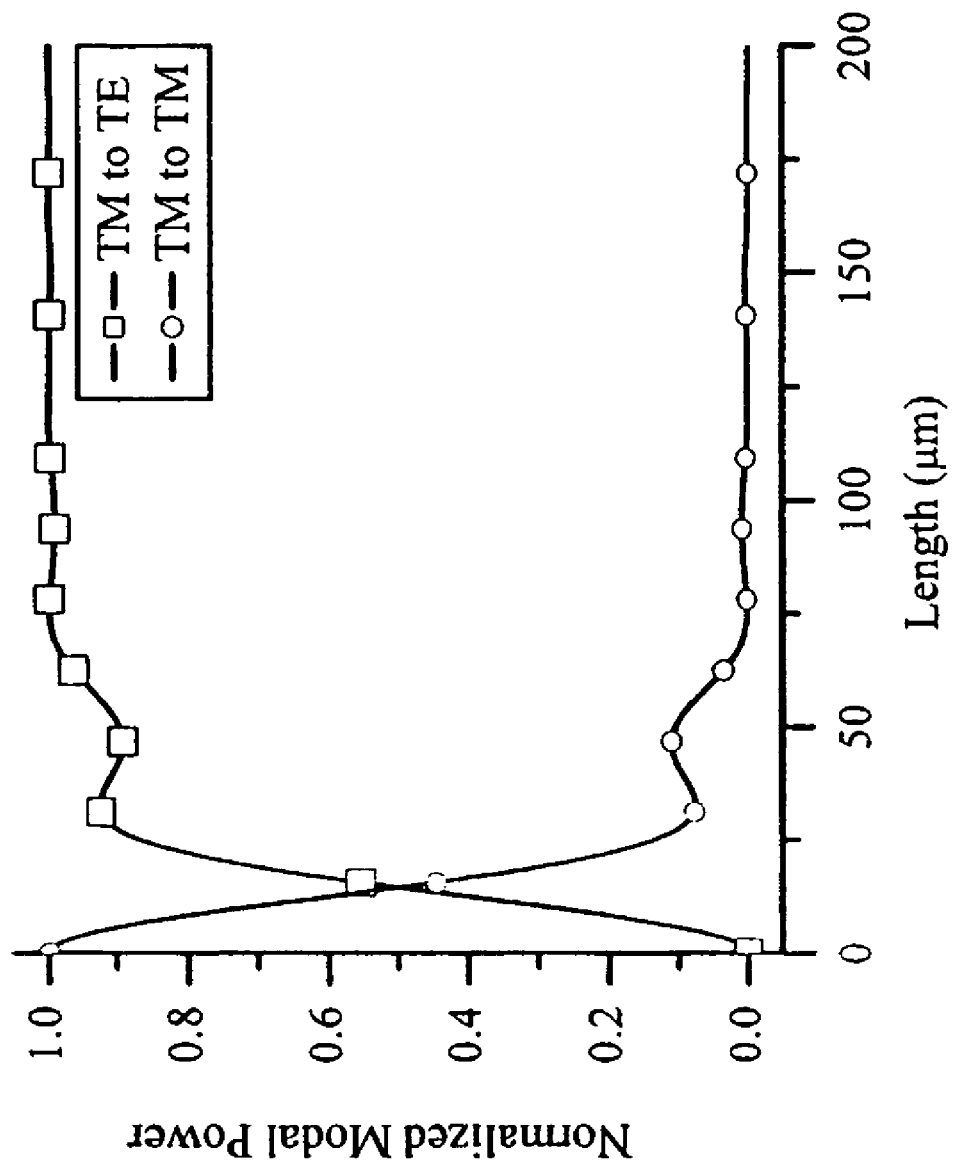
FIG. 11 is a graph demonstrating the performance of a particular implementation of the device in FIG. 10 as a function of the device length.

FIG. 11 is a graph demonstrating the performance of a particular embodiment of the structure depicted in FIG. 10 as a function of the structure length. In this embodiment, the parameters are set as follows; $h_1=h_2=0.4$ µm, $w_1=0.4$ µm, $w_2=0.8$ µm, $w_3=0.25$ µm, s=0.25 µm, and the core and cladding indices are 2.2 and 1.445, respectively. In other embodiments, these parameters can vary. Again, a three-dimensional mode scattering formulation was used to perform the simulation and the wavelength considered was 1.55 µm. Despite the asymmetry inherent to the two layer embodiment, the structure performs quite well with over 99% of the power transferred from the TM polarization to the TE polarization for structures of only a couple hundred microns in length.

Figure 12:
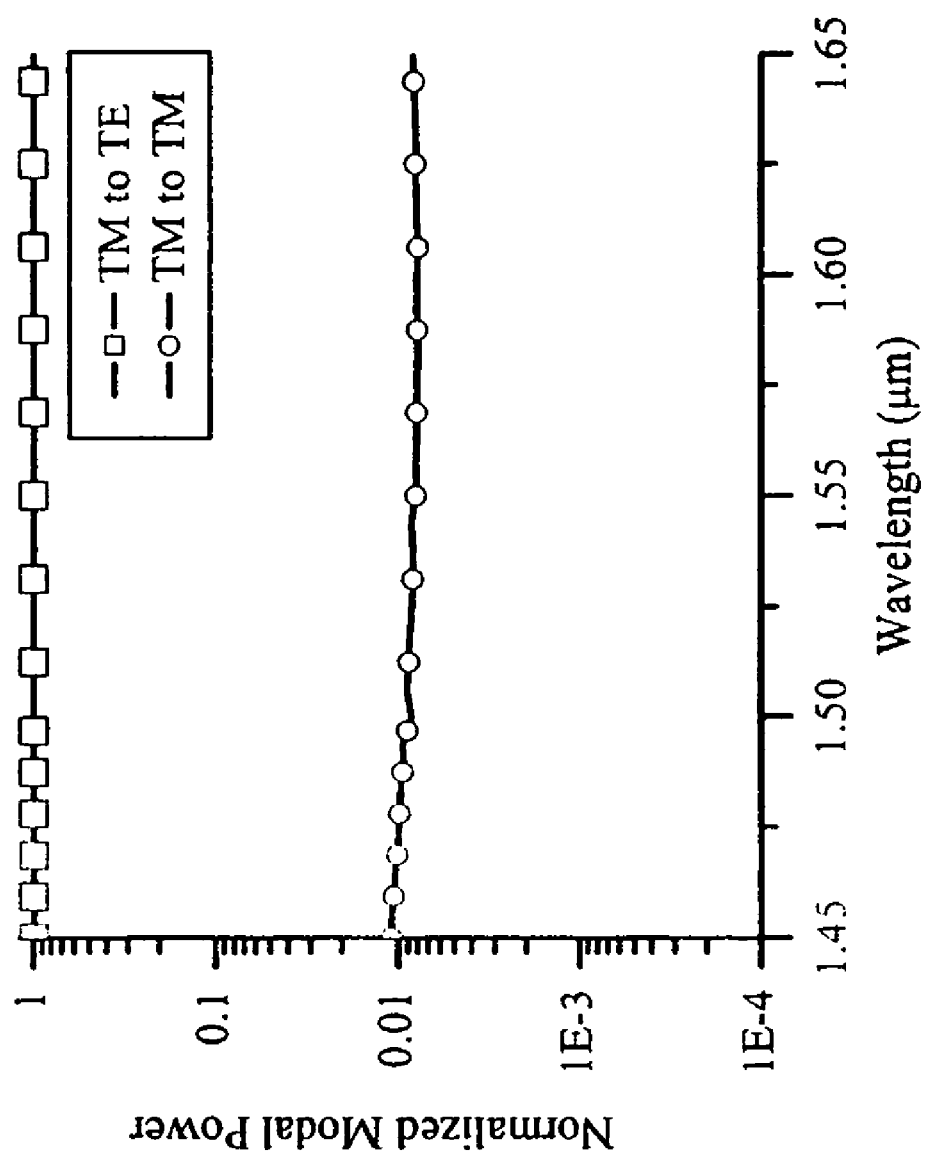
FIG. 12 is a graph demonstrating the performance of a particular implementation of the device in FIG. 10 as a function of the wavelength of the electromagnetic field.

FIG. 12 is a graph demonstrating the broadband performance of a 100 µm long implementation of the embodiment used for the simulation in FIG. 11. Again, a three-dimensional mode scattering formulation was used to perform the simulation. FIG. 12 shows that no wavelength sensitivity is discernable over the entire 1.45 µm to 1.65 µm regime.

Although the present invention has been shown and described with respect to several preferred embodiments thereof, various changes, omissions and additions to the form and detail thereof, may be made therein, without departing from the scope of the invention.

What is claimed is:

1. An integrated optic polarization converter comprising:
   a plurality of core layers configured to approximate a gradually twisted waveguide and therein adiabatically transform a propagating mode from an initial polarization state to a different final polarization state,
   wherein at least one of said core layers is tapered along a length of the polarization converter.

2. The polarization converter of claim 1 wherein said at least one of said core layers is tapered linearly along the length of the polarization converter.

3. The polarization converter of claim 1 wherein each core layer is tapered along the length of the polarization converter.

4. The polarization converter of claim 1 wherein said plurality of core layers consists of two core layers.

5. The polarization converter of claim 1 wherein said plurality of core layers comprises no more than three core layers.

6. The polarization converter of claim 1 wherein a cross section of a certain number of said core layers is maintained constant along the length of the polarization converter.

7. An integrated optic polarization converter comprising:
   a plurality of core layers configured to approximate a gradually twisted waveguide and therein adiabatically transform a propagating mode from an initial polarization state to a different final polarization state,
   wherein said plurality of core layers consists of two core layers.

8. The polarization converter of claim 7 wherein said two core layers are both tapered along a length of the polarization converter.

9. The polarization converter of claim 8, wherein a tapering of one of the two core layers is opposite to a tapering of the other of the two core layers along the length of the polarization converter.

10. An integrated optic polarization converter comprising:
    a plurality of core layers configured to approximate a gradually twisted waveguide and therein adiabatically transform a propagating mode from an initial polarization state to a different final polarization state,
    wherein said core layers are separated laterally along a length of the polarization converter.

11. The polarization converter of claim 10 wherein at least one of said core layers is tapered along the length of the polarization converter.

12. The polarization converter of claim 10 wherein said plurality of core layers consists of two core layers.

13. The polarization converter of claim 10 wherein said plurality of core layers comprises no more than three core layers.

14. The polarization converter of claim 10 wherein a cross section of a certain number of said core layers is maintained constant along the length of the polarization converter.

15. A method of using an integrated optic polarization converter, said method comprising:
    receiving an initial polarization state; and
    forming a plurality of core layers configured to approximate a gradually twisted waveguide and therein adiabatically transform a propagating mode from said initial polarization state to a different final polarization state,
    wherein at least one of said core layers is tapered along a length of the polarization converter.

16. A method of using an integrated optic polarization converter, said method comprising:
    receiving an initial polarization state; and
    forming a plurality of core layers configured to approximate a gradually twisted waveguide and therein adiabatically transform a propagating mode from said initial polarization state to a different final polarization state,
    wherein said plurality of core layers consists of two core layers.

* * * * *